UNITED STATES PATENT OFFICE.

ALFONS GAMS AND ERNST WYBERT, OF BASEL, SWITZERLAND, ASSIGNORS TO SOCIETY OF CHEMICAL INDUSTRY IN BASLE, OF BASEL, SWITZERLAND.

PROCESS OF PREPARING OPTICALLY-ACTIVE AROMATIC AMINOALCOHOLS.

1,423,101. Specification of Letters Patent. Patented July 18, 1922.

No Drawing. Application filed October 14, 1921. Serial No. 507,763.

*To all whom it may concern:*

Be it known that we, ALFONS GAMS and ERNST WYBERT, both citizens of the Swiss Republic, and residents of Basel, Switzerland, have invented a new Process of Preparing Optically-Active Aromatic Aminoalcohols, of which the following is a full, clear, and exact specification.

The hitherto known processes for the preparation of optically active aromatic aminoalcohols synthetically depend chiefly upon the fact, that the corresponding aminoketones are reduced in form of their inactive salts, e. g. hydrochlorides and sulfates, to the salts of the corresponding aminoalcohols. These were then transformed into the free bases by the action of alkali and the free bases then transformed to their tartrates for the purpose of separating the optical antipodes. From the latter were obtained, by the action of alkali, the free optically active aminoalcohols.

In view of the well known sensibility of most aromatic aminoalcohols against chemical reagents, especially such of an alkaline nature, it must appear desirable to find methods by which the chemical operations to be carried on with the final aminoalcohol are reduced to a minimum.

We have discovered, that this can be accomplished in very simple manner by reducing, instead of the inactive salts of the aminoketones, their optically active salts, for instance the bitartrates. The reduction is easily accomplished and yields directly a mixture of the optically active bitartrates of the aminoalcohols, of which, after separation of the antipodes, the free optically active bases can be obtained easily by the addition of alkali.

Whereas according to the processes employed hitherto the aminoalcohols had to be exposed to the action of alkali at least twice, before and after their separation into their optical antipodes, according to our process now only a single treatment with alkali becomes necessary. So with a technically important simplification of the processes hitherto known is given.

The new process will be illustrated by the following examples:

*Example 1.*

Into a solution of 34 parts of methylamino-acetopyrocatechol and 28 parts of d-tartaric acid (calculated amount) in 2500 parts of water, 105 parts of colloidal platinum solution (equivalent to 1.25 parts of platinum) are introduced and the mixture shaken with hydrogen, until the necessary amount of the latter has been absorbed. Thereupon the platinum is separated out, the solution evaporated down and small quantities of a well crystallizing by-product sucked off. The filtrate is evaporated to dryness and the residue taken up with methylalcohol. After inoculation with a crystal the l-o - dioxy - phenyl-ethanol - methylaminetartrate separates out, while the d-o-dioxyphenyl - ethanolmethylamine - d-tartrate remains in solution. The former is sucked off and from its aqueous solution the free l-o-dioxyphenyl-ethanol-methylamine is separted out by addition of ammonia. It corresponds to the well known, physiologically very active base, isolated from the adrenals and generally called "adrenaline."

In a similar manner the d-o-dioxyphenyl-ethanolmethylamine can be obtained after evaporation of the methylalcoholic solution of its bitartrate.

*Example 2.*

9.75 parts of ethylaminoacetopyrocatechol and 7.5 parts of d'tartaric acid are dissolved in 500 parts of water and, after the addition of colloidal platinum solution (0.3 parts of platinum) shaken, until the calculated amount of hydrogen has been absorbed. Thereupon the platinum is separted out and the filtrate evaporated to dryness. The residue is taken up with methylalcohol and a beautifully crystallizing bi-product sucked off. The filtrate is again evaporated to dryness and the residue, taken up with methylalcohol, separates out, after some time, the d - o-dioxyphenyl-ethanol-ethylamine-bitartrate, whereas the l-component remains in solution. From the solution of the d-component the free base is precipitated out by the addition of ammonia. The free base melts at 197° C. and is difficulty soluble in water, methylalcohol, ethylalcohol and other organic solvents, easily soluble in alkalies and acids.

In similar manner the l-o-dioxyphenyl-ethanol-ethylamine can be obtained after evaporation of the methylalcoholic solution. It also melts at 197° C.

What we claim is:

A process for the preparation of optically active aromatic aminoalcohols, which consists in reducing optically active salts of the corresponding aminoketones, separating the salts of the optically isomeric aminoalcohols formed from each other, and transforming them into the free bases by the usual methods.

In witness whereof we have hereunto signed our names this 29th day of September, 1921, in the presence of two subscribing witnesses.

ALFONS GAMS.
ERNST WYBERT.

Witnesses:
FRIEDA KURZ,
ARMAND RITTER.